(12) United States Patent
Gieras

(10) Patent No.: US 10,122,307 B2
(45) Date of Patent: Nov. 6, 2018

(54) DOUBLY STATOR-FED SYNCHRONOUS GENERATOR

(71) Applicant: Hamilton Sundstrand Corporation, Charlotte, NC (US)

(72) Inventor: Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/932,183

(22) Filed: Nov. 4, 2015

(65) Prior Publication Data
US 2017/0126158 A1    May 4, 2017

(51) Int. Cl.
| H02P 9/00 | (2006.01) |
| H02P 9/30 | (2006.01) |
| H02K 1/24 | (2006.01) |
| H02K 19/20 | (2006.01) |
| H02K 19/14 | (2006.01) |
| H02K 19/24 | (2006.01) |
| H02K 3/20 | (2006.01) |

(52) U.S. Cl.
CPC ............. *H02P 9/007* (2013.01); *H02K 1/246* (2013.01); *H02K 19/20* (2013.01); *H02K 3/20* (2013.01); *H02K 19/14* (2013.01); *H02K 19/24* (2013.01); *H02P 9/302* (2013.01)

(58) Field of Classification Search
CPC .... H02P 9/305; H02P 2009/005; H02P 9/007; H02P 9/302; H02K 19/38; H02K 19/20; H02K 3/20; H02K 19/14; H02K 19/24
USPC ......................................................... 322/59
See application file for complete search history.

(56) References Cited

U.S. PATENT DOCUMENTS

| 2,966,623 | A | * | 12/1960 | Mishkin | ............... | H02K 19/26 310/159 |
| 4,477,767 | A | * | 10/1984 | Cotzas | .................. | H02K 19/28 310/198 |
| 5,493,201 | A | * | 2/1996 | Baker | .................... | F02N 11/04 322/10 |
| 5,512,813 | A | * | 4/1996 | Uchinami | ............ | H02J 7/1446 320/163 |
| 5,594,322 | A | * | 1/1997 | Rozman | ................. | F02N 11/04 318/400.12 |
| 5,656,922 | A | * | 8/1997 | LaVelle | ................ | H02J 7/1438 310/181 |

(Continued)

FOREIGN PATENT DOCUMENTS

| CN | 103166402 A | 6/2013 |
| EP | 2301143 B1 | 11/2011 |

(Continued)

OTHER PUBLICATIONS

Extended European Search Report for EP Application No. 16197258. 3-1809, dated Mar. 24, 2017, pp. 1-29.

*Primary Examiner* — Julio C. Gonzalez
*Assistant Examiner* — Charles Reid, Jr.
(74) *Attorney, Agent, or Firm* — Cantor Colburn LLP

(57) ABSTRACT

According to an aspect of the disclosure herein, a generator is provided herein. The generator includes a rotor that further includes a plurality of slots. The generator also includes a three-phase winding configured to produce a first magnetic field and an excitation winding. The excitation winding is a material filling in the plurality of slots and produces a second magnetic field. In turn, a rotation of the generator induces alternating voltage in the stator three-phase winding and the stator excitation winding excites the magnetic flux in the rotor.

2 Claims, 5 Drawing Sheets

(56) References Cited

U.S. PATENT DOCUMENTS

| | | | | |
|---|---|---|---|---|
| 5,719,487 | A * | 2/1998 | Sato | H01L 29/7813 322/28 |
| 5,886,504 | A * | 3/1999 | Scott | B23K 9/1062 322/15 |
| 6,018,200 | A * | 1/2000 | Anderson | B23K 9/1062 290/1 A |
| 6,118,186 | A * | 9/2000 | Scott | H02P 9/04 290/1 A |
| 6,160,384 | A * | 12/2000 | Inaba | H02K 21/046 322/59 |
| 6,784,634 | B2 * | 8/2004 | Sweo | H02P 9/007 290/46 |
| 6,933,625 | B2 * | 8/2005 | Feddersen | F03D 7/0224 290/44 |
| 8,432,137 | B2 * | 4/2013 | Rozman | H02P 9/34 310/188 |
| 2001/0002777 | A1 | 6/2001 | Ravinovici et al. | |
| 2005/0162030 | A1 | 7/2005 | Shah et al. | |
| 2010/0181969 | A1 * | 7/2010 | Gieras | H02K 21/046 322/59 |
| 2011/0133703 | A1 * | 6/2011 | Rozman | H02K 19/34 322/59 |
| 2016/0056674 | A1 * | 2/2016 | Buettner | H02K 15/02 310/46 |

FOREIGN PATENT DOCUMENTS

| | | | |
|---|---|---|---|
| KR | 101318152 B1 | 10/2013 | |
| WO | WO 2009150464 A1 * | 12/2009 | H02P 9/007 |
| WO | 2014166555 A2 | 10/2014 | |
| WO | WO 2014166555 A2 * | 10/2014 | H02K 15/02 |

* cited by examiner

DOUBLY STATOR-FED SYNCHRONOUS GENERATOR

BACKGROUND

Generators, such as aircraft generators, require a brushless architecture for voltage control as the speed fluctuates along with fast voltage disconnection in failure modes (e.g., armature winding inter-turn short circuit). Contemporary implementations utilize a wound-field synchronous generator with brushless exciter and permanent magnet sub-exciter (e.g., three-machine set); yet, these contemporary implementations have limited performance.

BRIEF DESCRIPTION

According to an embodiment, a generator comprises a rotor comprising a plurality of slots; a three-phase winding configured to produce a first magnetic field; and an excitation winding comprising a material filling in the plurality of slots and configured to produce a second magnetic field, wherein a rotation of the generator occurs in accordance with an interaction between the first and second magnetic fields of the three-phase winding and the excitation winding.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

In view of the above, embodiments here relate to variable speed constant frequency applications where a doubly-fed alternating current generator provides better performance than contemporary implementations.

Figure 1:
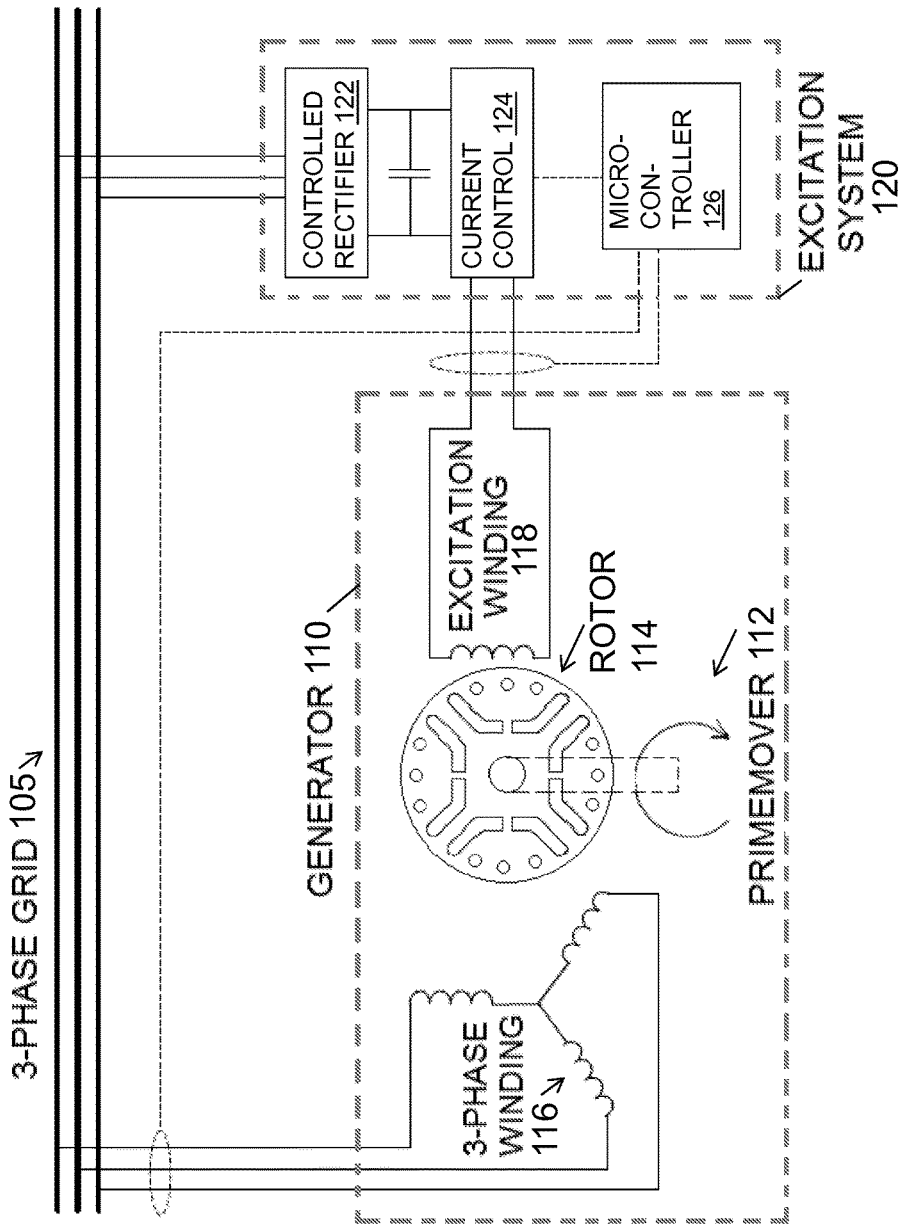
FIG. 1 is an example of an excitation system according to an embodiment of the present disclosure.

Turning now to FIG. 1, an example of an environment 100 according to an embodiment is depicted. The environment 100 operates as a brushless synchronous machine and includes a three-phase grid 105 connected to a doubly-fed alternating current generator 110. The doubly-fed alternating current generator 110 can include a prime mover 112, such as a shaft, that drives a rotor 114. The stator has a three-phase winding 116 and an excitation winding 118. The environment 100 further includes an excitation system 120 that includes a controlled rectifier 122, a current control 124, and microcontroller 126. The three-phase winding 116 (a.k.a. a three-phase stator winding) surrounds a parameter of the rotor 114 and delivers power to the three phase grid 105. The excitation winding 118 (a single phase winding) is integrated into the stator and is provided with a direct current supply.

The rotor 114 of the doubly-fed alternating current generator 110 is driven by the prime mover 112. As the rotor 114 rotates, an alternating voltage is induced in the three-phase winding 116 by a magnetic flux of the rotor 114. The stator excitation winding 118 excites the rotor 114 with magnetic flux. That is, the rotor 114 locks in with a rotating magnetic field of the three-phase windings 116 and rotates along with it. A three-phase current carried by the three-phase winding 116 produces the rotating magnetic field. Note that once the rotor 114 locks in with the rotating magnetic field, the doubly-fed alternating current generator 110 can be referred to as in a synchronization operation. Once the rotor 114 is in operation, the frequency in the three-phase winding 116 is dependent on the rotor 114 speed. The controlled rectifier 122 converts alternating current power from the three-phase grid 105 to a direct current field excitation current. The current control 124 adjusts the direct current field excitation current to produce an output current to the excitation winding 118. The microcontroller can be a small computer on a single integrated chip including a processor core, memory, and programmable instructions. The microcontroller 126 is configured to monitor real time voltage and current of all windings and provide a control signal to the current control 124 based on this monitoring (in accordance with the programmable instructions). This control signal causes the current control 124 to adjust the direct current field excitation current. Thus, the excitation system 120 can provide a stable current to the excitation winding 118 during excitation.

The rotor 114, driven by the prime mover 112, induces an alternating voltage in the three-phase winding 116. The excitation winding 118 excites the magnetic flux in the rotor 114. In an embodiment, the three-phase windings 116 can include $2p_p$ poles, be referred to as a power winding (three-phase winding 116), and be directly connected to the three-phase grid 105. Further, the excitation winding 118 can include $2p_c$ poles, be referred to as a control winding, and provide excitation for the environment 100. The rotor 114 with magnetic flux barriers-replaces contemporary implementations of cage windings, such that the bars and segments of end rings of a cage winding can be divided into rotor nests. The rotor 114 can also be equipped with additional cage winding (hybrid rotor). For instance, the rotor can be a combination of magnetic flux barriers as described below and cage windings ("nests").

A number of rotor nests can be calculated according to Equation 1.

$$N = p_p + p_c \qquad \text{Equation 1}$$

where N is the number of rotor nests and $p_p$ and $p_c$ are the number of pole pairs of the power and control winding, respectively. A rotational speed n can be determined by frequencies $f_p$ and $f_c$ and the numbers of pole pairs $p_p$ and $p_c$ of the power and control winding, respectively, according to Equation 2. In the case of direct current excitation of the winding 118, the frequency $f_c = 0$.

$$n = \frac{f_p + f_c}{p_p + p_c} \quad \text{Equation 2}$$

Figure 2:
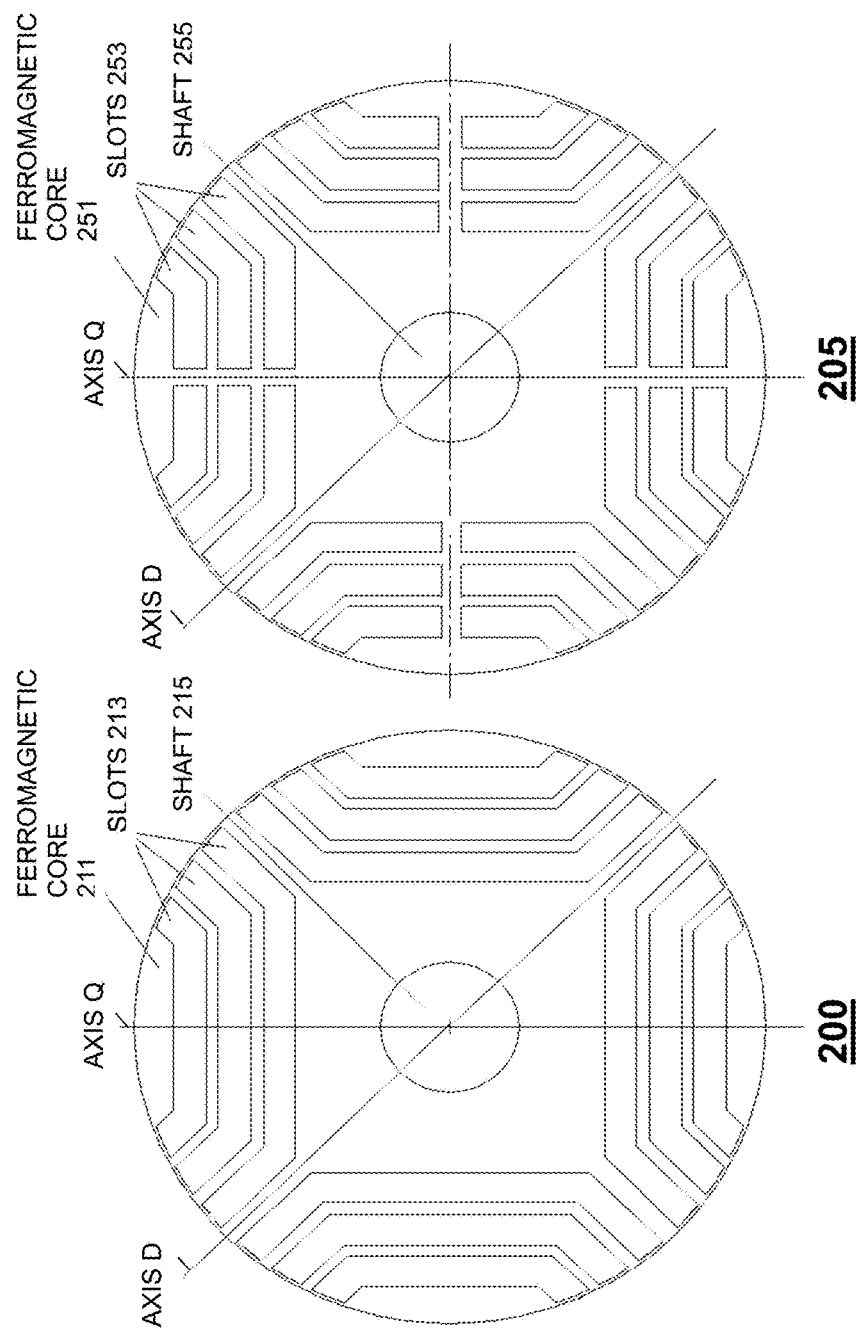
FIG. 2 depicts examples of four-pole cylindrical rotors with magnetic flux barriers according to an embodiment of the present disclosure.
Figure 3:
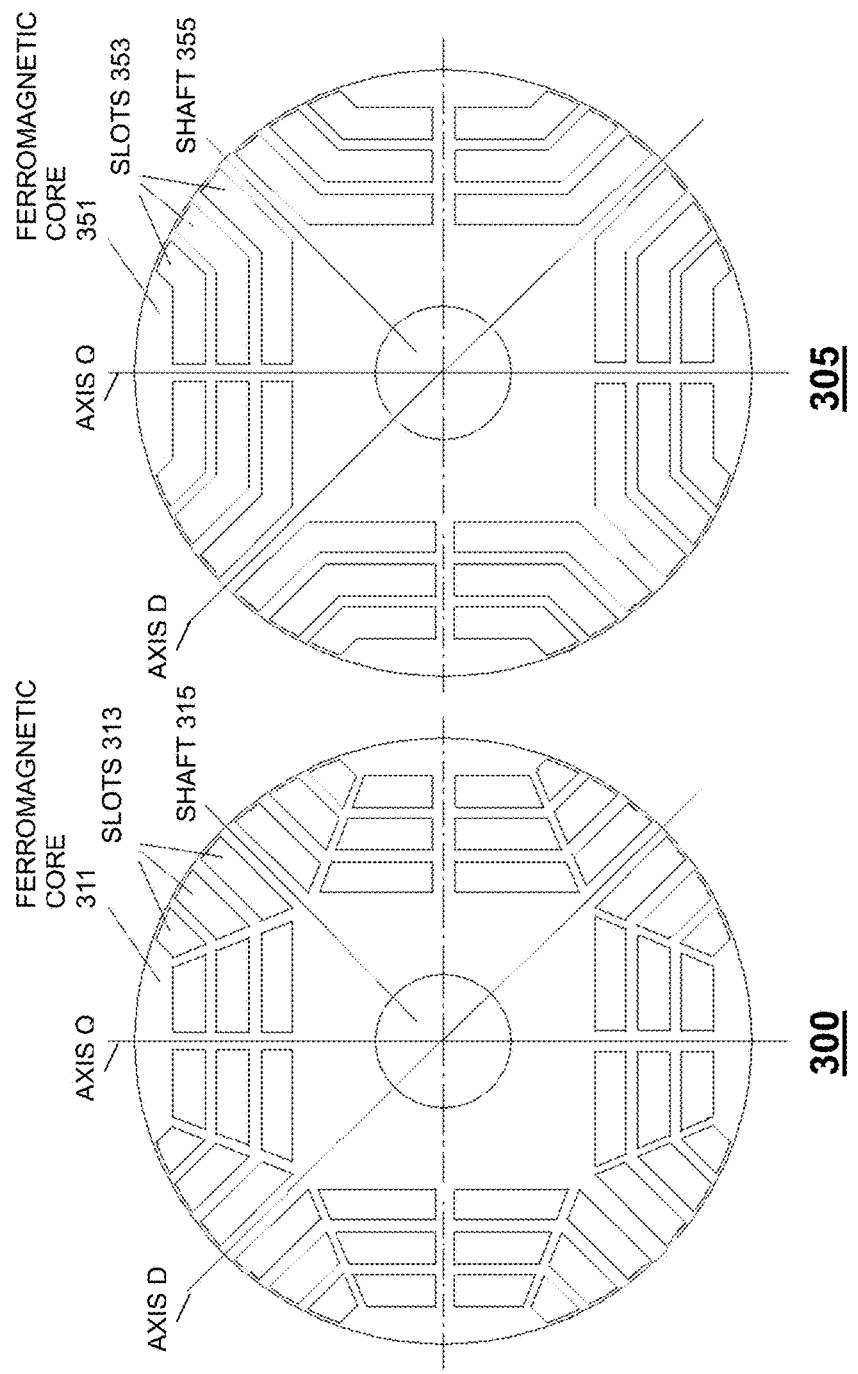
FIG. 3 depicts additional examples of four-pole cylindrical rotors with magnetic flux barriers according to an embodiment of the present disclosure.
Figure 4:
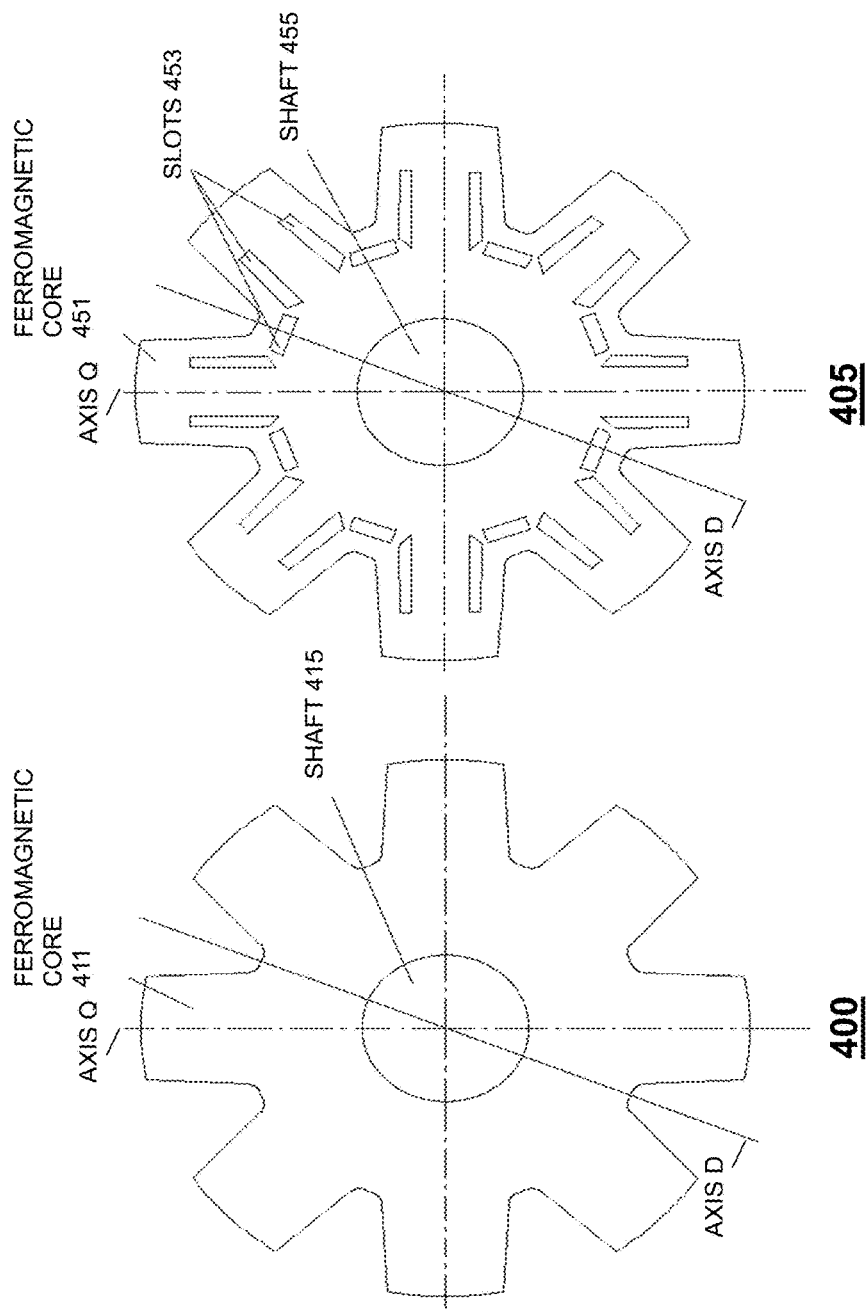
FIG. 4 depicts example of eight-pole salient-pole rotors with magnetic flux barriers according to an embodiment of the present disclosure.

The rotor 114 can be of reluctance type with magnetic flux barriers (see FIGS. 2-4). The number of rotor poles N must meet the condition given by Equation 1. Note that the number of power winding pole pairs can be different that the number of field excitation pole pairs as shown in Equation 3.

$$p_p \neq p_c \quad \text{Equation 3}$$

From reliability point of view, it is better to place both the armature three-phase winding and the field excitation winding in the stator slots, embodiments of which are now described with respect to FIGS. 2-4.

FIG. 2 is an example of four-pole cylindrical rotors 200, 205 according to an embodiment. Each four-pole cylindrical rotors 200, 205 includes, respectively, a ferromagnetic core 211, 251, a plurality of slots 213, 253 (e.g., magnetic flux barriers), and a shaft 215, 255 of the prime mover 112 and the rotor 114. Note that the shaft of the prime mover 112, e.g., turbine engine, is coupled with the rotor 114 of the doubly-fed alternating current generator 110. Also, an Axis D is the direct axis, i.e., the axis of the magnetic flux, and an Axis Q is a quadrature axis electrically orthogonal to the "d" axis. Note that the plurality of slots 213, 253 can be filled with aluminum or other alloy to imitate a cage winding (e.g., excitation winding 118).

FIG. 3 is another example of four-pole cylindrical rotors 300, 305 according to an embodiment. Each four-pole cylindrical rotors 300, 305 includes, respectively, a ferromagnetic core 311, 351, a plurality of slots 313, 353 (e.g., magnetic flux barriers), and a shaft 315, 355. Also, an Axis D is the direct axis, i.e., the axis of the magnetic flux, and an Axis Q is a quadrature axis electrically orthogonal to the "d" axis. Note that the plurality of slots 313, 353 can be filled with aluminum or other alloy to imitate a cage winding (e.g., excitation winding 118).

FIG. 4 is an example of eight-pole salient-pole rotors 400, 405 according to an embodiment. Each of the eight-pole salient-pole rotors 400, 405, respectively, includes a ferromagnetic core 411, 451 and a shaft 415, 455 of the prime mover 112. The eight-pole salient-pole rotor 405 can also include a plurality of slots 453 (e.g., magnetic flux barriers) that can be filled with aluminum or other alloy to imitate a cage winding. Also, an Axis D is the direct axis, i.e., the axis of the magnetic flux, and an Axis Q is a quadrature axis electrically orthogonal to the "d" axis.

Figure 5:
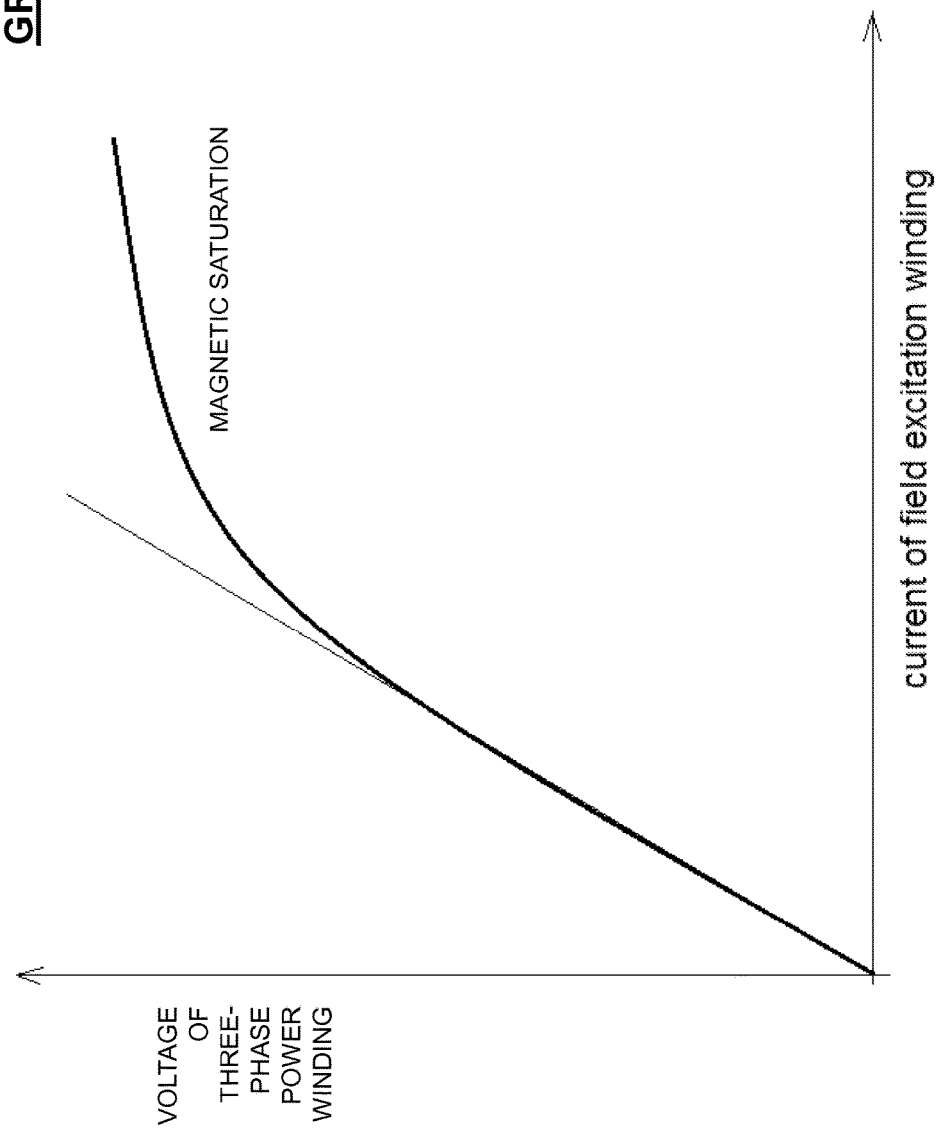
FIG. 5 is an example graph of a voltage of three-phase power winding versus filed excitation current at constant speed according to an embodiment of the present disclosure.

In view of the above, FIG. 5 is an example graph 500 of a voltage of three-phase power winding versus filed excitation current at constant speed according to an embodiment, where an output voltage—excitation current characteristic is shown. Note that the curve is nonlinear due to the magnetic saturation at high field excitation current.

Technical effects and benefits of embodiments herein include a rotor with magnetic flux barriers that are an easy to manufacture structure with a high reliability and high electromechanical energy conversion efficiency. That is, no rotor excitation losses occur to the magnetic flux barriers as any power losses are dissipated in the stator (which also allows for good heat transfer).

Further, the technical effects and benefits of embodiments herein include a brushless design in which a direct current is delivered to the stator field excitation winding while the rotor is not fed with electric current; an adjustable field excitation current where an output rms voltage of this generator system is stable; and regulated reactive power. Note that the maximum and minimum field excitation current can be controlled (lowered or limited) to prevent over-excitation and under-excitation problems. Also, when a malfunction or failure occurs inside a generator, e.g., inter-turn short circuit, embodiments herein can cut off the field excitation current to prevent damaging corresponding or coupled electrical systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A brushless synchronous machine comprising a doubly-fed alternating current generator and an excitation system, the doubly-fed alternating current generator comprising:
    a rotor comprising a plurality of slots and a ferromagnetic core, plurality of slots being filled in by a material comprising aluminum or an alloy to form a plurality of magnetic flux barriers to provide no rotor excitation losses by dissipating power losses to a stator;
    a three-phase winding configured to produce a first magnetic field; and
    an excitation winding comprising a same material as the material filling in the plurality of slots and configured to produce a second magnetic field,
    wherein a rotation of the generator induces alternating voltage in the three-phase winding, and
    wherein the excitation winding excites a magnetic flux in the rotor,
    wherein the generator is coupled to the excitation system,
    wherein the excitation system comprises a controlled rectifier, a current control, and a microcontroller, the current control being configured to adjust a direct current field excitation current based on a control signal from the microcontroller to produce an output current to the excitation winding, the microcontroller being configured to monitor a real time voltage and a current of the three-phase winding and the excitation winding and provide a control signal to the current control based on the monitoring, the control signal cause the current control to adjust the direct current field excitation current so the excitation system provides a stable current to the excitation winding during excitation, and the controlled rectifier being configured to convert alternating current power from a three-phase grid to a direct current field excitation current that is fed to the current control.

2. The doubly-fed alternating current generator of claim 1, further comprising a prime mover of the generator drives the rotor.

* * * * *